(12) United States Patent
Sperber et al.

(10) Patent No.: US 7,430,656 B2
(45) Date of Patent: Sep. 30, 2008

(54) SYSTEM AND METHOD OF CONVERTING DATA FORMATS AND COMMUNICATING BETWEEN EXECUTION UNITS

(75) Inventors: Zeev Sperber, Zichron Yaakov (IL); Ittai Anati, Haifa (IL); Oded Liron, Givaat Ada (IL); Mohammad Abdallah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 465 days.

(21) Appl. No.: 10/334,114

(22) Filed: Dec. 31, 2002

(65) Prior Publication Data

US 2004/0128486 A1 Jul. 1, 2004

(51) Int. Cl.
*G06F 7/38* (2006.01)
*G06F 9/00* (2006.01)
*G06F 9/44* (2006.01)
*G06F 15/00* (2006.01)
*G06F 7/00* (2006.01)

(52) U.S. Cl. .................. 712/221; 708/204; 708/205; 708/495

(58) Field of Classification Search ............... 712/247; 708/204, 205, 495
See application file for complete search history.

(56) References Cited

U.S. PATENT DOCUMENTS

| 5,652,862 | A | * | 7/1997 | Hanson | 711/165 |
| 5,768,169 | A | | 6/1998 | Sharangpani | |
| 6,002,393 | A | * | 12/1999 | Hite et al. | 715/719 |
| 6,219,780 | B1 | * | 4/2001 | Lipasti | 712/215 |
| 6,321,327 | B1 | | 11/2001 | Makineni et al. | |
| 6,829,627 | B2 | * | 12/2004 | Krygowski et al. | 708/204 |
| 2004/0128331 | A1 | * | 7/2004 | Hinds et al. | 708/204 |

OTHER PUBLICATIONS

IEEE Standard for Binary Floating-Point Arithmetic.*

* cited by examiner

*Primary Examiner*—Eddie P Chan
*Assistant Examiner*—Brian P Johnson
(74) *Attorney, Agent, or Firm*—Trop, Pruner & Hu, P.C.

(57) ABSTRACT

A method and system including transmitting data in an architectural format between execution units in a multi-type instruction set architecture and converting data received in the architectural format to an internal format and data output in the internal format to the architectural format based on an operation code and a data type of a microinstruction.

10 Claims, 4 Drawing Sheets

SYSTEM AND METHOD OF CONVERTING DATA FORMATS AND COMMUNICATING BETWEEN EXECUTION UNITS

BACKGROUND OF THE INVENTION

New computer chip architectures may be developed to increase processing speed and accuracy. In developing a chip architecture, there may be a tradeoff between the speed of normal execution and exception handling. For example, exception handling may be done in hardware, micro-code, or a combination thereof. Additionally, depending on where conversion between different data types takes place, there may be a single set of architectural registers or a multiplicity. Different architectures to date have taken different approaches.

There are applications in which the same operation is often performed repeatedly over a series of values. Parallel processing has been developed to operate on multiple data sets simultaneously. Such processors may use packed data formats and SIMD (single instruction-stream, multiple data-stream) instruction sets.

BRIEF DESCRIPTION OF THE DRAWINGS

Aspects of the present invention may best be understood by reference to the following detailed description when read with the accompanying drawings, in which.

In the drawings, like numerals describe substantially similar components throughout the serial views.

DETAILED DESCRIPTION OF THE PRESENT INVENTION

Figure 1:
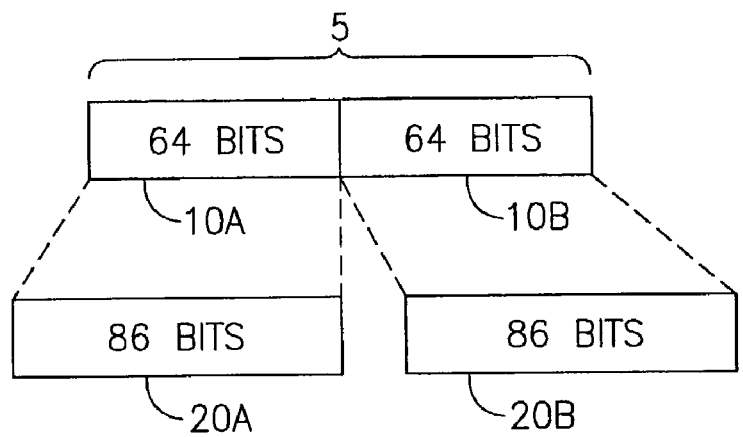
FIG. 1 is a block diagram illustration of an architectural format and an internal format of a packed double number, in accordance with an embodiment of the present invention.

In the following detailed description, numerous specific details are set forth in order to provide a thorough understanding of the invention. However, it will be understood by those of ordinary skill in the art that the present invention may be practiced without these specific details. In other instances, well-known methods, procedures, and components have not been described in detail so as not to obscure the present invention.

Unless specifically stated otherwise, as apparent from the following discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), Flash, magnetic or optical cards, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to constrict a more specialized apparatus to perform the desired method. The desired structure for a variety of these systems will appear from the description below. In addition, embodiments of the present invention are not described with reference to any particular programming language. It will be appreciated that a variety of programing languages may be used to implement the teachings of the invention as described herein.

In the disclosure hereinbelow, the use of the term "normal operation" indicates operation in which no underflow or denormal values are generated or input, values that may cause an exception to be raised.

In the disclosure hereinbelow, the use of the term "architectural format" includes memory format as well. In the discussion hereinbelow, the term includes all formats used in normal operation to store data in the processor's memory or register file. It includes the formats normally used to transfer data. The term "internal format" includes formats that may be used internally by an execution unit. Different execution units may use different formats.

Reference is now made to FIG. 1, a block diagram illustration of an architectural format and an internal format of a packed double number, in accordance with an embodiment of the present invention. An architectural packed double number (labeled 5) may comprise, for example, 128 contiguous bits, wherein one number (labeled 10A) is stored in bits 127-64, and a second number (labeled 10B) is stored in bits 63-0. In an alternative embodiment (not shown), the two numbers 10A and 10B may be stored, for example, in two contiguous 64-bit segments. Upon translation to internal format, each number may be expanded from 64 bits to 86 bits creating two separate numbers 20A and 20B.

These two formats may be an example of the tradeoffs in chip design when attempting to reduce complexity. It may be desirable to keep format size as small as possible to allow proper operation of a multi-type instruction set architecture (ISA). An example of a multi-type ISA is SSE™ (streaming SIMD extension) or SSE2™. However, a smaller format may allow fewer significant bits in a result, bits which may be needed for exception handling or in representing an intermediate result. For example, in floating point addition and multiplication, two common exception conditions may be denormal numbers and underflow, which may be caused by intermediate results that may require a wider foliate for resolution. Hence, it may be common to use a wider format for intermediary results and, when necessary, handle underflow and denormal values as exceptions.

Two other number types used in an arithmetic execution unit may be packed single and packed integer, which may also have corresponding internal formats. A packed single may comprise, for example, four 32 bit numbers whose corresponding wider internal formats may comprise, for example, one 79 bit or two 39 bit segments. A packed integer number (also referred to as a vector integer) may comprise, for example, any of sixteen 8-bit, eight 16-bit, or four 32-bit numbers in the 128 bits of the architectural format. However, the corresponding internal format may remain the same size, for a total of 128 bits.

Figure 2:
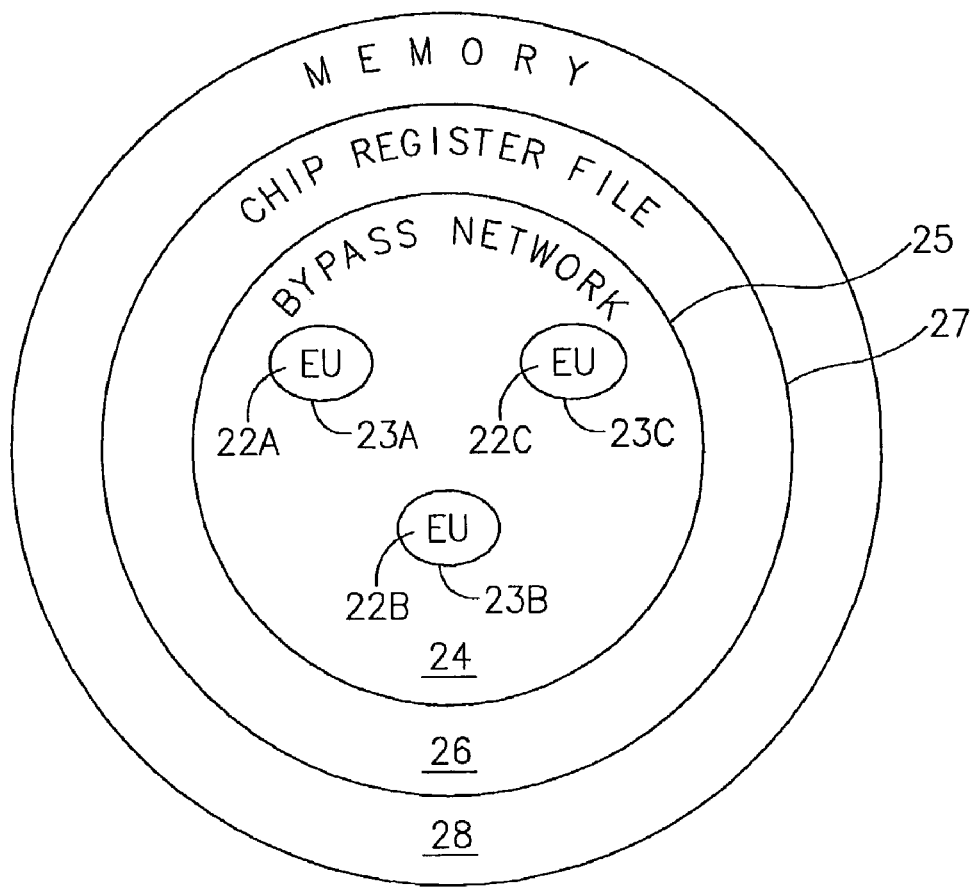
FIG. 2 is a figurative illustration of possible layers in a processor, in an embodiment of the present invention.

FIG. 2, to which reference is now made, is a figurative illustration of possible layers in a processor, in an embodiment of the present invention, wherein the innermost circle may reflect the lowest level or layer in the processor architecture and the outermost circle may reflect the highest architectural level. The innermost layer may be comprised of at least one execution unit 22. The next layer may be comprised of a bypass network 24 which may be used to transmit data between execution units 22. A chip register file 26 may comprise the next level, wherein register formats may be stored. Finally, the highest layer may be memory 28, which may comprise, for example, RAM (random access memory) or cache. RAM may further comprise, for example, static RAM (S-RAM) and dynamic RAM (D-RAM).

Each circle, 23A, 23B, 23C, 25, and 27 may symbolize the boundary between the adjacent layers. Hence, boundary circles 23A, 23B, and 23C may depict the boundary between execution units 22A, 22B, and 22C (reflectively) and bypass network 24. A boundary circle 25 may reflect the boundary between bypass network 24 and chip register file 26, and a boundary circle 27 may reflect the boundary between chip register file 26 and memory 28.

In an embodiment of the present invention, during normal operation, data used in arithmetic execution units may be in internal format, whereas data in non-arithmetic execution units, register file 26, and memory 28 may be stored in the possibly smaller architectural format. Thus, it may be necessity at some point to convert the data from internal format to architectural format and vice versa. This may depend on which data format may be represented in the intermediary levels bypass network 24 and chip register file 26. In an embodiment of the present invention, data conversion may generally occur between execution unit 22 and bypass network 24 when execution unit 22 uses the internal format. This will be further discussed hereinbelow with respect to FIGS. 3 and 4. Thus, the smaller architectural format may be used in all of the levels from bypass network 24 to memory 28, including chip register file 26, which may result in a savings in complexity and space on the chip.

Use of internal format in a given execution unit 22 may depend on the type of operations performed in that particular execution unit 22. For example, non-arithmetic execution units 22 may remain in architectural format. Arithmetic execution units 22 performing integer operations, for example, may generally not require the extra precision of the internal format as the result size may always correspond to the input data size. However, arithmetic execution units 22 may require the extra precision afforded by use of the internal format during the course of floating point operations, for example, during floating point addition and multiplication.

In an embodiment of the present invention, during exception handling, intermediate data may be stored in register file 26 and/or memory 28 in the wider internal format. The formal result may be stored in architectural format. Thus, it may still be necessary at some point to convert the data from internal format to architectural format and vice versa. However, during exception handling, it may be necessary to have a different procedure and/or control for when the data conversion may occur.

In an embodiment of the present invention a non-typed architecture may be used, wherein a given register may load any instruction of any type and data may be freely transferred between macroinstructions of any type. The same set of architectural registers may be used for all data types and operations (for example, packed single, packed double, packed integer, and logical operation) as they may all comprise the same number of bits. In an embodiment of the present invention, all registers in the register file may actually be big enough to store the maximum sized internal format value. For example, all registers may be 86 bits wide, which may be the size of one packed double word in internal format. Thus, any register may be able to store any architectural value in only 64 bits of the register. Any internal format number may also be stored, however, the number of bits used may be different for each data type.

Figure 3:
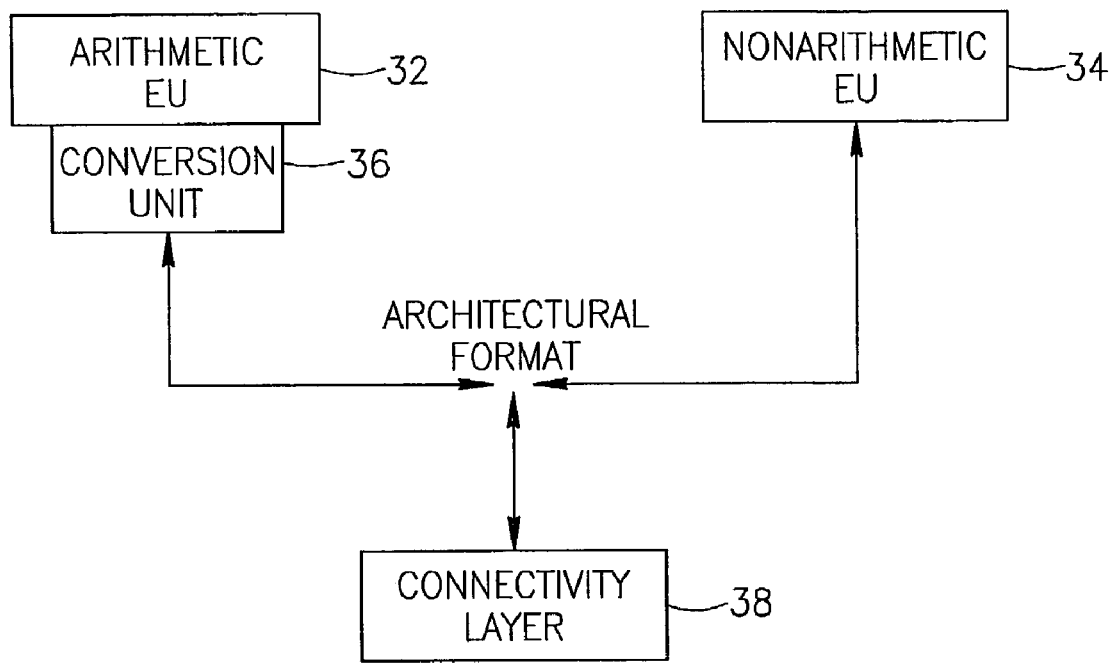
FIG. 3 is a data flow illustration of normal data transfer between elements of a processor, in an embodiment of the present invention.

Reference is now made to FIG. 3, a data flow illustration of normal data transfer between elements of a processor, in an embodiment of the present invention. A processor may comprise an arithmetic execution unit 32, a non-arithmetic execution unit 34, a conversion unit 36 associated with arithmetic execution unit 32, and connectivity layer 38. Connectivity layer 38 may comprise interfaces to any data cache or out of order (OOO) logic unit, for example a reorder buffer (ROB) or reservation station (RS) buffer. Data may be transferred between any of arithmetic execution unit 32, non-arithmetic unit 34, and connectivity layer 38 (as shown by the data flow arrows).

Any data input (or output) to (or from) arithmetic execution unit 32 may first pass through conversion unit 36, which may comprise the actual interface with the other elements. Data transfer between any of arithmetic execution unit 32 (via conversion unit 36), non-arithmetic execution unit 34, and connectivity layer 38 may be in architectural format (as shown by the data flow arrows). Conversion when necessary may be performed by conversion unit 36 as data is passed in or out of arithmetic execution unit 32. Conversion unit 36 may physically be a part of arithmetic execution unit 32 or may be operatively associated with arithmetic execution unit 32.

In an implementation of a multi-type instruction set architecture, assembler macroinstructions may be converted into a flow of microinstruction, which may be executed by the execution units. A microinstruction may comprise, for example, all operation code, a target register, and all operation type. The operation type may be based on the data type expected by the operation. Micro code refers to a long sequence of microinstructions.

During normal operation data may be transmitted between execution units 32 in an architectural, format. It is understood, that the transmission between execution units may in fact comprise entering and leaving an execution unit 32 via a conversion unit 36 as explained further hereinabove. The data received in the architectural format may be converted to an internal format based on the operation code and the operation type of a given microinstruction. Conversion may comprise determining the operation code and the type associated with the operation and translating the data received by conversion unit 36. The conversion may allow the representation of a wider intermediate result during execution of the microinstruction. Conversion may also be performed from the internal format to the memory format when the operation is complete.

In normal execution, as data may generally be transferred in architectural format, the bypass between execution units 32 and/or 34 may be easier since all execution units receive data and produce results in the same format regardless of the data type used in the execution of the operation. Whenever the operation to be performed in an execution unit may require data in internal format (as defined by the operating instruction) conversion may takes place in conversion L unit 36 on entry to and exit from arithmetic execution unit 32.

This data flow, wherein all conversions may be done on entry/exit from/to arithmetic execution unit 32, may save time since conversions may be done immediately. It may not be necessary to pass data out to higher architectural layers such as the register file for conversion when data is produced in one type and transferred into ail execution unit that consumes a different type. Furthermore, no special procedures may be necessary in instructions receiving mixed data types.

No data type checking may be necessary on data input/output to/from arithmetic execution units, as conversion may be done automatically regardless of the type data being input or output. Hence, a floating point operation output result, which will be input to a further, floating point operation, may be converted into and from architectural format in the interim.

Thus, this data flow may comprise a method of communicating in an architectural format between executions units on an integrated circuit, wherein the execution units may operate on and/or produce different data types. This communication method may comprise converting a number that is in an architectural format to a number in an internal format before entry to an execution unit, if required by the operating instruction, and converting the result from a number in internal format to a number in architectural format on exit from the execution unit.

As mentioned, these conversions may be required only on floating point operations in arithmetic execution units 32.

During exception handling data may be transmitted between execution units 32 in an architectural format or an internal format. It is understood, that the transmission between execution units may in fact comprise entering and leaving an execution unit 32 via a conversion unit 36 as explained further hereinabove. Whether conversion should be performed may be managed based on either a microinstruction type or an exception type. These conversion management decisions may override the data conversions that may be performed during normal operation and may execute exception handling micro code.

In an embodiment of the present invention, an operation set may exist for each data type. However, as mentioned, data type is not enforced. Thus, it may be possible to purposely use a mixed data type for an operation in order to achieve an advantage. For example, a packed single number may be transformed into its log value by using a packed integer execution unit such as a shifter unit to perform a shift operation and may thus save space and reduce complexity.

Figure 4:
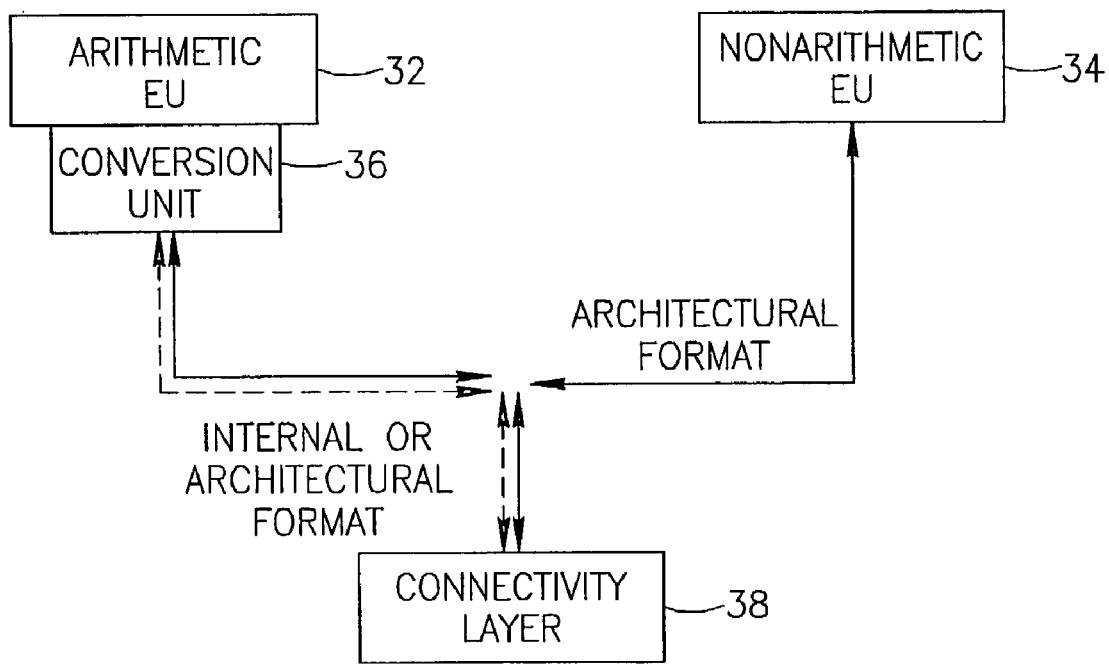
FIG. 4 is a data flow illustration of exception data transfer in the processor of FIG. 3, in an embodiment of the present invention.

FIG. 4, to which reference is flow made, is a data flow illustration of exception data transfer in the processor of FIG. 3, in an embodiment of the present invention. The same elements are shown as in FIG. 3, arithmetic execution unit 32, non-arithmetic execution unit 34, conversion unit 36 associated with arithmetic execution unit 32, and connectivity layer 38. As in normal operation, data transfer between any of arithmetic execution unit 32 (via conversion unit 36), non-arithmetic execution unit 34, and connectivity layer 38 may be in architectural format (as shown by the solid data flow arrows). Conversion when necessary may be performed by conversion unit 36 as data is passed in or out of arithmetic execution unit 32. However, in an embodiment of the present invention, data transfer between arithmetic execution unit 32 and connectivity layer 38 may also be in internal format (as shown by the dashed data flow arrows).

As mentioned hereinabove, underflow results and denormal data input may require special handling. If it is possible to deal with these conditions directly in the hardware, it may not be necessary to raise an "exception" and incur the time penalty that may be caused by the use of special exception handling micro code. However, as the hardware of the existing multiplication and addition execution units may not currently contain the capability to resolve these cases, it may be necessary to add additional hardware. For example, it may be necessary to add clocks for repairing the operation and chip space for the repairing logic itself. This may cause performance problems and may require special code coverage testing. In an embodiment of the present invention, such hardware may not be added; instead micro code may be invoked to handle the exception cases and may use existing logic to do the repair.

As further mentioned hereinabove, the use of a wider internal format may allow the representation of underflow results without the loss of precision. As the internal format may comprise a greater number of bits, it may be possible to save an underflow result as a denormal number in the architectural format, as explained hereinbelow. It may also be possible in internal format, to represent a number that in architectural format is a denormal value, as a normal floating point number due to the wider format.

There may be cases when conversion logic 36 may be instructed not to convert a value. For example, no conversion may occur when a repaired denormal value that is represented in internal format is received as an input or when an underflow has been created as an output. In these cases, the values may be represented in the internal format. In these cases, the data may be sent to an appropriate arithmetic execution unit 32 without conversion being performed by conversion unit 36 and the value may be fixed as instructed by the micro code.

An embodiment of the present invention may not fix underflow in hardware as this may require a more complex rounder, which may be able to perform a massive right shift. As an adder unit may comprise the circuitry to perform a massive right shift operation, the micro code may instruct the adder unit to perform the operation instead. This may save both in the complexity of the rounder unit and the performance of coverage checks of a new, more complicated rounder.

As mentioned hereinabove, the architecture of the present invention may use untyped data. Thus, the data may comprise no identity information. However, in a controlled environment of exception handling it may be possible to adequately test these cases. An exception may be raised by the setting of a flag, for example, underflow. The micro code may determine the data type, as the micro code may know which operation faulted and the data type information may be present in the operation instruction code.

To correct an underflow result, the micro code may denormalize the value; it may shift the mantissa of the result and may set the exponent to zero. The case of a denormal value input may be determined by the presence of a zero exponent and a non-zero mantissa. It may be possible to normalize the denormal value when converted to the wider internal format such that the first "1" in the mantissa is shifted right and the exponent is increased accordingly.

In parallel processing, forward operations may have been performed on data that may raise an exception. However, the inclusion of these erroneous results may be prevented by the retirement logic.

Figure 5:
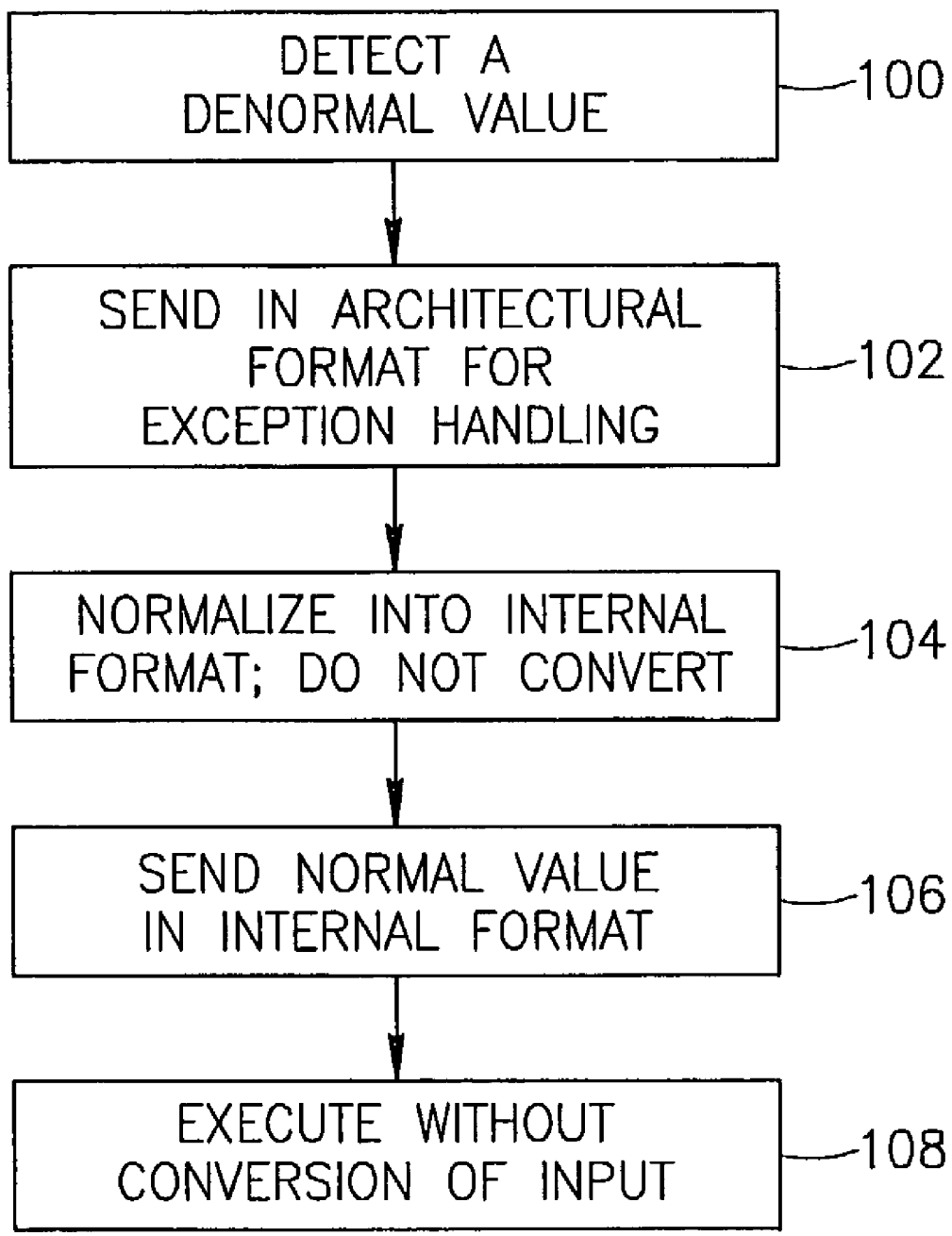
FIG. 5 is a flow chart diagram of exception handling when a denormal value is input to a first execution unit, in accordance with an embodiment of the present invention.

Reference is now made to FIG. 5, a flow chart diagram of exception handling when a denormal value is input to a first execution unit, in accordance with an embodiment of the present invention. A denormal value may be detected by a first execution unit and an exception may be raised (stage 100). The denormal number may be sent in architectural format to an appropriate, possibly different, execution unit for handling (stage 102). The appropriate execution unit may normalize the number into an internal format value but may instruct the converter not to convert the normal number back to architectural format on exit from the appropriate execution unit (stage 104). The value, now a normal number in internal format, may be transmitted to the register file and then back to the first execution unit in internal format (stage 106). The first execution unit may execute its operations without converting the internal format input value (stage 108), processing may continue as appropriate, and the result may generally be in architectural format.

Figure 6:
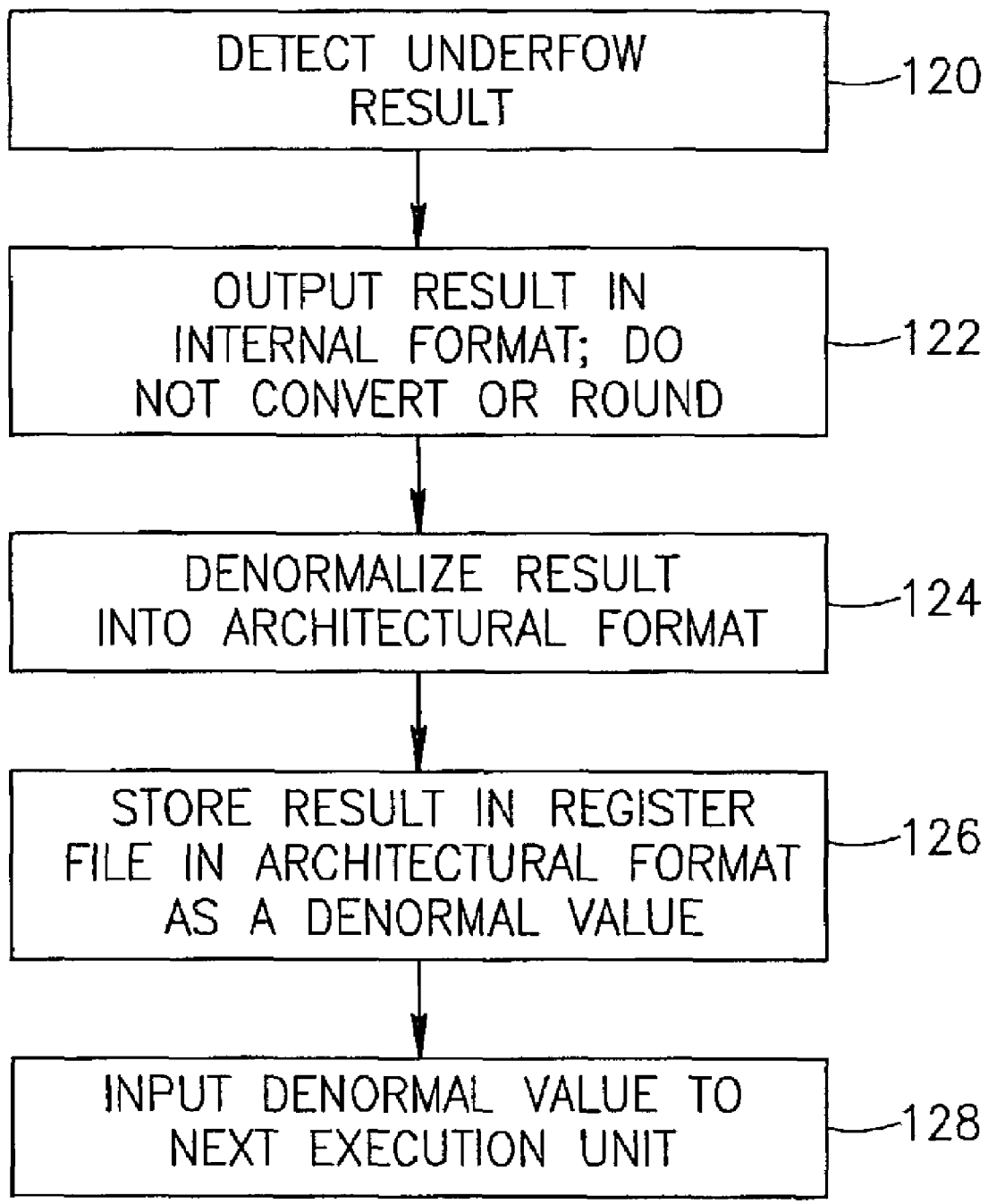
FIG. 6 is a flow chart diagram of exception handling when an underflow result is created by a first execution unit, in accordance with an embodiment of the present invention.

FIG. 6, to which reference is now made, is a flow chart diagram of exception handling when an underflow result is created by a first execution unit, in accordance with an embodiment of the present invention. The first execution unit may detect an underflow result (stage 120). The result, in internal format, may be output without conversion or rounding and stored in the register file (stage 122). The result may be sent to an appropriate, possibly different, execution unit to be denormalized in architectural format (stage 124). The result may be stored in a register file in architectural format as a denormal value (stage 126). The denormal value may be input to the next operation execution unit (stage 128).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
   sending a denormal value in an architectural format to an execution unit for correction of an exception, said exception being receipt of the denormal value in data sent to a receiving execution unit and having associated exception-handling microinstructions;
   normalizing the denormal value into a normal number in an internal format;
   storing the normal number in the internal format in a register file;
   sending the normal number in the internal format to the receiving execution unit for processing; and
   instructing the receiving execution unit by at least one of said exception-handling microinstructions associated with said data not to convert the normal number before processing.

2. The method of claim 1, comprising transmitting said data between said receiving execution unit and a second execution unit and a register file.

3. The method of claim 1, comprising:
   instructing said receiving execution unit by at least one microinstruction of said exception-handling microinstructions not to convert the result from the internal format to the architectural format after correction of the exception.

4. An integrated circuit comprising:
   a first execution unit to send a denormal value in an architectural format to a second execution unit for correction of an exception, said exception being receipt of the denormal value in data sent to the first execution unit and having associated exception-handling microinstructions;
   the second execution unit to normalize the denormal value into a normal number in the internal format, to store the normal number in the internal format in a chip register file, to send the normal number in the internal format to the first execution unit for processing, and to instruct the first execution unit by at least one of said exception-handling microinstructions associated with said data not to convert the normal number before processing.

5. The integrated circuit of claim 4 wherein the second execution unit is to transmit said data to the first execution unit and to the chip register file.

6. The integrated circuit of claim 4 wherein the second execution unit is to instruct the first execution unit by at least one microinstruction of said exception-handling microinstructions not to convert the normal number from the internal format to the architectural format after correction of the exception.

7. A system comprising:
   a memory to store instructions of a multi-type instruction set architecture;
   a chip register file to store data in an internal format of the multi-type instruction set architecture;
   a first execution unit to send a denormal value in an architectural format to a second execution unit for correction of an exception, said exception being receipt of the denormal value in data sent to the first execution unit and having associated exception-handling microinstructions;
   the second execution unit to normalize the denormal value into a normal number in the internal format, to store the normal number in the internal format in the chip register file, to send the normal number in the internal format to the first execution unit for processing, and to instruct the first execution unit by at least one of said exception-handling microinstructions associated with said data not to convert the normal number before processing.

8. The system of claim 7 wherein the second execution unit is to transmit said data to the first execution unit and to the chip register file.

9. The system of claim 7 wherein the second execution unit is to instruct the first execution unit by at least one microinstruction of said exception-handling microinstructions not to convert the normal number from the internal format to the architectural format after correction of the exception.

10. The system of claim 7 wherein the memory is to store Streaming Single Instruction, Multiple Data Extension instructions.

* * * * *